Jan. 30, 1923.
P. SHEEDY.
POWER OPERATED VALVE REVERSING GEAR.
FILED MAR. 22, 1922.

INVENTOR

Patented Jan. 30, 1923.

1,443,888

UNITED STATES PATENT OFFICE.

PATRICK SHEEDY, OF LOS ANGELES, CALIFORNIA.

POWER-OPERATED VALVE-REVERSING GEAR.

Application filed March 22, 1922. Serial No. 545,840.

*To all whom it may concern:*

Be it known that I, PATRICK SHEEDY, a citizen of the United States, and a resident of Los Angeles, county of Los Angeles, and State of California, have invented certain new and useful Improvements in Power-Operated Valve-Reversing Gears, of which the following is a specification.

The hereinafter described invention relates to that class of power driven mechanism used in reversing and positioning the valves on the valve seats in point of cutoff for the introduction of pressure fluid into the cylinders of reciprocating engines, the application being particularly exemplified in moving the heavy valves on the valve seats of modern steam locomotives by fluid pressure, whereby the engineer is afforded relief and safety over manually operated valve gears; the essentials of such apparatus involving the use of a cylinder and piston, operating valve, piston rod, crosshead and crosshead guide, all connected through the reverse shaft of the locomotive to the valve in the steam chest.

One of the objects of the invention is to provide a simple construction which will overcome the inefficiencies at present existing in power reverse gears principally occasioned through the linkage connections obtaining between the control lever, operating valve and the main crosshead, which connections are the vital factors in the functioning of the gear, in that movement of the control lever to the desired positions or points of cutoff shifts the valve from its closed or shut off position, opening the passage of pressure therethrough into the cylinder; the piston and crosshead moving out or in, as the case may be, and the valve returning by means of the linkage to its shut off position thereby closing the passage of pressure into the cylinder and causing the piston to come to rest at the desired position as set by the control lever on its quadrant; but it is in the inability of the linkage connections to normally stand the wear of service that the device fails to maintain the shut off position of the operating valve at the desired position corresponding to the position of the control lever on its quadrant, as intended and required, in order to operate properly and not permit a pressure to be built up in the cylinder through the operating valve being slightly off its seat, which pressure causes the piston to gradually move or creep forward or back, as the engine may be in forward or back motion, and falsely position the engine valve in the steam chest over the desired position as set on the quadrant of the control lever to effectively and economically work steam through the valve into the locomotive cylinder; it being impossible to hold the valve in the steam chest in point of steam cutoff as set without creeping. The failure of the operating valve to maintain a shut off position at whatever point the control lever on the quadrant be set as designed, is due to the wear between the pins and bushings forming the linkage connections, a relatively small amount of wear between these parts causing the operating valve to position itself slightly off its seat and the wear of service greatly aggravating this condition, making it impossible unless constant attention and maintenance be given to retaining the fit between the pins and bushings, for the gear to function efficiently as intended and it is in rectifying this design and its operative weakness through the elimination of all linkage connections between the control lever, operating valve and crosshead with their accompanying pins and bushings, and employing in lieu thereof fluid pressure connection from the operating valve direct to the cylinder for the movement of the piston and crosshead with its attached gear, that the merit of my invention stands out.

Another object of the invention is to provide an operating valve which, when positioned on either side of centre, will introduce pressure therethrough into one end of the cylinder and simultaneously release the pressure in its opposite end so that the piston can readily move forward or back in positioning the gear as desired without being retarded by pressure on the opposite side thereof, and which when positioned on centre will introduce equal pressure on both sides of the piston and simultaneously admit pressure to an auxiliary piston actuating a lock on the crosshead thereby assuring the fixed position of the gear without creeping and without disturbance or chatter, as when, through lack of lubrication, the engine valve in the valve chest becomes dry and excessive friction occurs in its movement; the equalized pressure on either side of the piston being maintained by check valves even though excessive leakage occur as through worn or blowing piston rod packing, defective pipe or flange connections, blow holes or the like, the check valves opening and permitting pressure to enter the cylinder against the piston and build up any leakage occurring, so that the leakage which now destroys the efficiency of equalized pressure on either side of the piston in power reverse gears is eliminated; it being possible by my improved construction to overcome leakage practically up to the full capacity of the pipe and check valve through which the pressure is delivered into either end of the cylinder.

A further object of the invention is to connect an indicator to the crosshead so that an exact reproduction of the movement and positioning of the valve in the steam chest will occur in such manner that the engineer will have complete vision of the actual happening in positioning the valve on its seat rather than an assumed or relative idea of its position which is only possible to obtain at present through the control lever on the quadrant, as movement of the lever does not cover the full distance of travel of the valve on its seat on account of the linkage connections obtaining between the control lever and the crosshead of the gear. By having an exact reproduction of the valve location in the steam chest and its fixed position when set in point of cutoff, the engineer is able to effect an economy in working steam not now possible through the assumed position designated by the control lever on the quadrant.

In order to fully comprehend the invention reference is made to the accompanying drawings in which

Figs. 2, 3, 4 and 5 show enlarged views of my improved construction as an entirety, Fig. 2 being a side elevation partly in section through the main operating cylinder to better illustrate the fluid pressure connections thereto, as well as partly in section through the crosshead locking cylinder, to show the pressure connections to same, Fig. 3 an end elevation of the main cylinder with crosshead on guide bar; pipe connections being shown into the main cylinder and locking cylinder, Fig. 4 a plan view of indicator showing relation of pointer to markings on indicator guide bar, these markings denoting accurately the full locomotive valve movement in its seat, Fig. 5 an enlarged elevation in section showing the position of the check valves used between the front and back ends of the cylinder for maintaining equalized pressure on either side of main piston.

Figs. 6 and 7 show an end elevation and a side elevation, respectively, of the operating valve assembled as in practice.

The general working relation of the parts and their description follows: in which 10 denotes the main working cylinder with piston, 11, and piston rod, 12. Connected to the end of piston rod, 12, and fitted on guide bar, 13, is crosshead, 14, and locking cylinder, 15. Also connected to crosshead, 14, pivotally at 16 is the rear end of reach rod, 17, of any of the standard types of locomotive valve gear, for example, the Walschaert gear, to which my improved construction is shown connected in Fig. 1.

Fluid pressure is used as the motive power for driving the gear and may be steam or air, but preferably the latter, taken from the locomotive main air reservoir. Control of pressure to the working parts is effected through operating valve, 18, shown in the present instance as a rotary type, the same having proved to be well suited to the service, although any operating valve equivalently ported, as hereafter described, for the passage of pressure therethrough to the working parts of the gear can be used. Operating valve, 18, comprises a body, $18^a$, with main pressure inlet, $18^b$, and exhaust pressure outlet, $18^c$, and has ported leads through its body tapped at their outer ends for pipe connection, of which $18^d$ is piped to communicate with the front end of the main cylinder, 10, $18^e$ to communicate with the back end of cylinder, 10, and $18^f$ to communicate with crosshead locking cylinder, 15, the three ports terminating on their inner ends in seat $18^g$. Ground on valve seat, $18^g$, is valve, $18^h$, with ports, $18^i$ and $18^j$, passing clear through the valve to the ground seat. Valve, $18^h$, is housed by chamber, $18^k$, the latter being jointed against the valve body, $18^a$, to include direct communication with main air inlet, $18^b$, thereby providing that the ports, $18^i$ and $18^j$, are always filled with pressure fluid. The bottom of valve, $18^h$, is cored with an exhaust cavity comprising depressions, $18^l$, $18^m$, $18^n$ and $18^o$, all leading into the central cored depression, $18^p$, which latter registers with exhaust outlet, $18^c$. Valve, $18^h$, is moved on its seat, $18^g$, to lap the ports, as required, in working the gear by stem, $18^q$ upon which is affixed control handle, $18^r$. In setting the parts as in practice, operating valve, 18, is positioned convenient to the hand of the engineer and cylinder, 10, is substantially bracketed in place to permit of ready connection between the crosshead, 14, and reach rod, 17, of the valve gear and tight joint pipe connections are made up between the tapped end of port, $18^d$, and the front end of the cylinder at 19, the tapped end of port, $18^e$, and the back end of the cylinder at 20, and the tapped end of port, $18^f$ and crosshead locking cylinder, 15, at 21. Locking cylinder, 15, is fitted with a piston and piston rod, the latter terminating in a shoe or latch, 22, preferably formed with milled teeth thereon, being adapted to engage with milled teeth likewise made on the under side of guide bar, 13, so that when pressure is applied against the piston in any position of the crosshead, the teeth on the shoe and guide bar will be engaged. A spring, 23, bearing against the end of the cylinder and the piston assures the release of the shoe or latch, 22, against the guide bar, 13, upon removal of pressure in the cylinder, 15.

To compensate for the movement of the crosshead, 14, in its travel on guide bar, 13, a movable tight pipe connection is provided in the pipe line leading from the port, $18^f$, to the locking cylinder, 15, a simple means of making such connection being shown through the provision of a fixed stuffing box, 24, with tight receptacle, 25, telescoping the pipe, 26, leading to cylinder, 15, permitting the latter to lengthen or shorten, as required, to suit the travel of the crosshead.

Connected into the pipe line leading from port, $18^f$, to locking cylinder, 15, at 27 is an intermediary pipe connection, 28, with branches, 29 and 30, leading to the front and rear ends, respectively, of the main cylinder, 10, through the connections, 19 and 20. Check valves, 31 and 32, are set in the branch pipes, 29 and 30, with seats to lift when pressure is passing through the pipe line to locking cylinder, 15, to balance the pressure on either side of piston, 11, as hereinafter described.

Conveniently located in the locomotive cab within the vision of the engineer is an indicator consisting of a guide bar, 33, upon which is positioned crosshead, 34. Parallel to guide, 33, is bar, 35, the top of which is laid off to indicate the position of the valve in the steam chest of the locomotive at maximum, minimum and intermediate points of cutoff. Affixed to crosshead, 34, is a needle or indicator pointer, 36, set to work closely adjacent the markings on guide bar, 33. Crosshead, 34, and main crosshead, 14, are pivotally connected at 37 and 38, respectively through rod, 39, so that upon movement of crosshead, 14, the indicator crosshead, 34, moves the same distance; the guide bar, 13, upon which crosshead, 14, works and the guide bar, 33, upon which the indicator crosshead, 34, works, being of such length as to accommodate exactly the same length of travel, and as the crosshead, 14, denotes the exact length of travel and position of the locomotive valve in its valve seat, therefore the indicator crosshead, 34, being direct connected to crosshead, 14, denotes the same conditions on marked indicator bar, 33.

It is within the scope of my invention to employ any equivalent construction to that herein shown and described and the assembly of the parts may be rearranged to suit local conditions of application without departing from the spirit of the invention.

From the foregoing description of the parts and their general service arrangement, the following description of their operation is herewith set out.

It is first desired to bring out the fact that the two valve ports, $18^i$ and $18^j$, in chamber, $18^k$, are always filled with pressure fluid and for the purpose of description will be called live air ports, and that it is in the positioning of these ports over the seat ports, $18^d$, $18^e$ and $18^f$, that the complete control of the gear is effected. The two live air ports have been located opposite each other and in such relation to the three seat ports that both cannot communicate pressure through the valve, 18, at the same time: In this manner it is possible to lap the live valve ports over the seat ports leading to the working parts of the apparatus so that distinct operations occur at different times, and entirely independent of each other.

It is highly desirable to have the operating valve work accordingly so as to communicate and exhaust the fluid pressure through the seat ports to the working parts in stages, thereby avoiding any possibility of conflict or error in having one moving part intended to function in advance of the other do so. For example, locking the crosshead, 14, on guide bar, 13, simultaneously with the equalizing or balancing of the pressure on either side of main piston, 11, is an operation distinct from and in advance of the operation which admits pressure on the one end of the main piston and simultaneously releases it on the opposite end so as to permit the cross head and attached gear to readily move forward or back as desired.

What may be expressed as the neutral position of the operating valve, 18, is when the control handle, $18^r$, is set to lap one live pressure port, $18^i$, in full register with the seat port, $18^f$, leading to the crosshead locking cylinder, 15, at which time the other live port, $18^j$, is blanked against the ground valve seat out of action between the two other seat ports, $18^d$ and $18^e$, leading to the front end and back end, respectively, of the main cylinder, 10. In this position all functioning of the gear is at rest and positively locked against movement.

Figure 10:
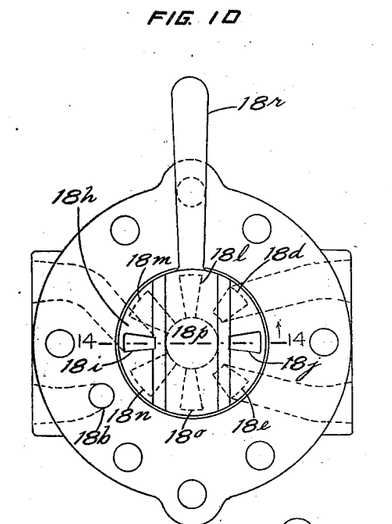
Figs. 10, 11, 12 and 13 are diagrammatical views in plan of the operating valve showing four different positions of the inside valve on its valve seat, and the lapping of the ports of the valve on the ports of the valve seat through movement of the control handle as occurs in practice, the four stages illustrating from vertical or neutral position of the control handle to extreme right position as when the locomotive valve is being moved forward by the gear in its seat.
Figure 11:
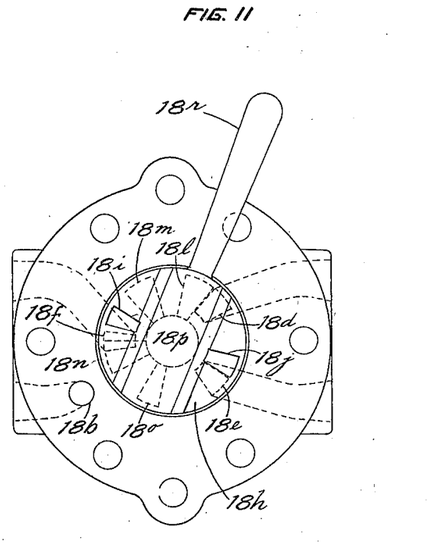

In order to fully appreciate the working of the operating valve, reference is best made to diagrammatical views Figs. 10, 11, 12 and 13, in which Fig. 10 shows the neutral position, above referred to, with control handle, $18^r$, vertical, this being the preferable way of setting the valve for convenience to the engineer's hand. In this position the two live pressure ports, $18^i$ and $18^j$, in the valve, $18^h$, are shown in full lines, the port, $18^i$, fully registering with seat port, $18^f$, and the port, $18^j$, being out of service between the seat ports, $18^d$ and $18^e$, shown dotted. Now figuring that the engineer desires to move the locomotive forward, the valve gear must be put in forward motion; accordingly the control handle, $18^r$, is moved forward or clockwise, the Fig. 11 showing the valve port, $18^i$, having passed out of communication with seat port, $18^f$, and the exhaust depression, $18^n$, of valve $18^h$, overlapping seat port, $18^f$, thereby exhausting the pressure out of the line to the locking cylinder, 15, releasing the lock against the guide bar, 13, and removing the equalized pressure on either side of main piston, 11, putting the latter in condition to be freely moved when pressure is applied against it. It will be noted that valve port, $18^i$, is an appreciable distance out of communication with seat port, $18^f$, and is blanked out of action against the ground valve seat and that the valve port, $18^j$, has not quite started to lap seat port, $18^e$ leading to the back end of cylinder, 10. By locating the valve ports in relation to the seat ports in this way, there is no question about the one valve port, $18^i$, being fully out of action before the other valve port, $18^j$, goes into action, and assurance is thereby given that the crosshead lock is entirely freed before any movement of the piston, 11, and crosshead, 14, with attached gear occurs.

Figure 12:
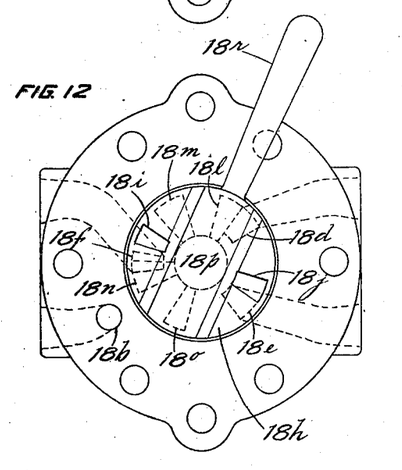
Figure 13:
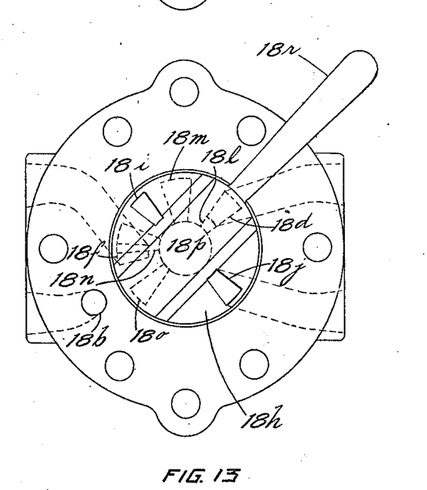
Figure 14:
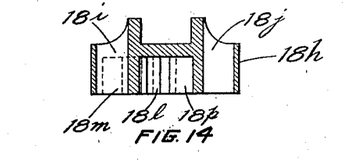
Fig. 14 is a sectional elevation of the inside valve of the operating valve being taken on line 14—14, Fig 10, for the purpose of showing that the valve has two pressure ports cut clear through it to its ground seat, as well as exhaust depressions shown dotted, leading into a central exhaust cavity.

Now turning the control handle, $18^r$, slightly further, as shown in Fig. 12, we bring the edge of valve port, $18^j$ line and line with the edge of seat port, $18^e$, just ready for the admittance of pressure to the back end of the cylinder and the edge of the exhaust depression, $18^l$, line and line with the edge of seat port, $18^d$, just ready to exhaust the pressure out of the front end of the cylinder. Continuing to turn control handle, $18^r$, as far as possible to the right against a stop, positions the valve port, $18^j$, in complete register over the seat port, $18^e$, and simultaneously brings the exhaust depression, $18^l$, into full register with seat port, $18^d$, leading to the front end of the cylinder, whereby the piston crosshead and valve gear attached thereto are free to move forward in positioning the locomotive valve in the valve seat, admitting full pressure into the back end of the cylinder and releasing all back pressure in the front end of the cylinder, the piston, crosshead and attached gear moving forward without pressure obstruction in positioning the locomotive valve in its valve seat; the length of travel of the piston, or length of stroke of the valve, being entirely within the discretion of the engineer, after which operating handle, $18^r$, is moved back to neutral position as shown in Fig. 10; the cycle of operation being to always start with the control lever, $18^r$, in neutral position and return to neutral position during which occurs first, the release of the crosshead lock and the removal of the balancing pressure on either side of the piston; second, the admittance of pressure to one end of the cylinder and the exhaust of the pressure from the opposite end of the cylinder; third, the time allowed the admitted pressure to carry the piston as far as desired; and fourth, the locking of the crosshead again in whatever position the piston has been placed, which means wherever the engineer desires to position the locomotive valve in its valve seat. In case the engineer desires to shorten the point of cutoff of the locomotive valve in its valve seat after having started his engine on long stroke or maximum movement of piston, 11, which is the usual practice after train load has been started and speed attained, he moves the control handle, $18^r$, backward or counterclockwise when the crosshead lock is released, the balanced pressure on either side of the piston removed and the pressure admitted to the front end of the cylinder and released from the back end of the cylinder, the piston moving back just as far as the engineer desires to set his point of cutoff when the control handle, 18ʳ, is again brought back to its neutral position and the crosshead lock set again.

The valve ports and seat ports are so arranged that they function exactly the same when the control handle is moved to the left or counterclockwise as they do when the control handle is moved to the right or clockwise, the operation being the same either side of the neutral position, as shown in Fig. 10, it obviously being necessary that this be arranged for in order that the valve gear may be put in reverse motion as when the engineer is backing up, or changing the point of cutoff of the locomotive valve in its seat, as just described. The engineer is guided accurately in knowing the position of the piston or the position of the main crosshead attached thereto, which is the same position as the locomotive valve in its seat, by the auxiliary crosshead indicator directly connected to the main crosshead, and which being located in the cab within his vision permits him to effectively position the locomotive valve in its seat with a true knowledge of its movement and location.

Of particular consequence in the practical operation of my improved gear arrangement is the positive maintenance of equalized or balanced pressure on either side of the piston when the latter is at rest, as when the locomotive valve has been positioned in its valve seat in point of cutoff, for in the power reverse gears at present in use, it is on account of their inability to maintain equalized pressure on either side of the piston that creeping of the locomotive valve on its seat is caused, thereby falsely positioning the valve over that intended, and materially reducing the economy in steam consumption of the locomotive under load. Creeping of the locomotive valve in its seat causes undue shock on the working parts of the apparatus and increased wear on the locomotive valves and valve seats themselves in addition to causing an ever fluctuating change in the pull of the normal locomotive exhaust, and this has a direct effect in the fuel economy of the locomotive, as the fireman in locomotive practice changes or regulates his fire to suit the strength of the exhaust, being ever watchful in noting the changes in steam working by the engineer in order to regulate his fire accordingly, but insomuch as the creeping of the valve on its seat cannot be reckoned with on account of its intermittent and uncertain happening, it is impossible for the fireman to maintain the same fuel economy as when the locomotive valve is positively assured in its seat against movement after once being set, as is accomplished in my improved device.

Again, the economy in the working of steam knowingly by the engineer is of greatest importance but with a spasmodic or ever slightly changing position of the locomotive valve on its seat, it is not within the province of the engineer to economically work his engine.

The operating efficiency of my construction is realized through the constant maintenance of equalized pressure on either side of the piston, during which time the crosshead is locked in position thereby positively preventing creeping of the locomotive valve in its seat, this accomplishment being effected entirely without the aid of links, pins and connections commonly used in the movement of the operating valve for the admittance of pressure into the working cylinder of power reverse gears. In my improved construction fluid pressure is used entirely in working all moving parts in the place of pivotal connections, it having been found in practice that it is ever hard to maintain a true functioning of pivotally connected operating valves in power reverse gears, unless all lost motion between the links and pins is constantly taken up and this requires continual vigilance and expense which is not practical in every day railroad operation. A small wear of the pins in their bushings causes a considerable lost motion in the operating valve on its seat, on account of the leverage of the linkage connected thereto, making it impossible to entirely shut off the inlet of pressure into the cylinder, as intended, the inlet valve positioning itself slightly off its seat when it is supposed to be entirely shut off, letting pressure creep into the cylinder not intended and causing the locomotive valve as attached to the piston and crosshead to jump forward or creep periodically.

The operation of fluid pressure as used in my invention in overcoming the inefficiencies of the linkage connections, as now used, is herewith set out.

Figure 1:
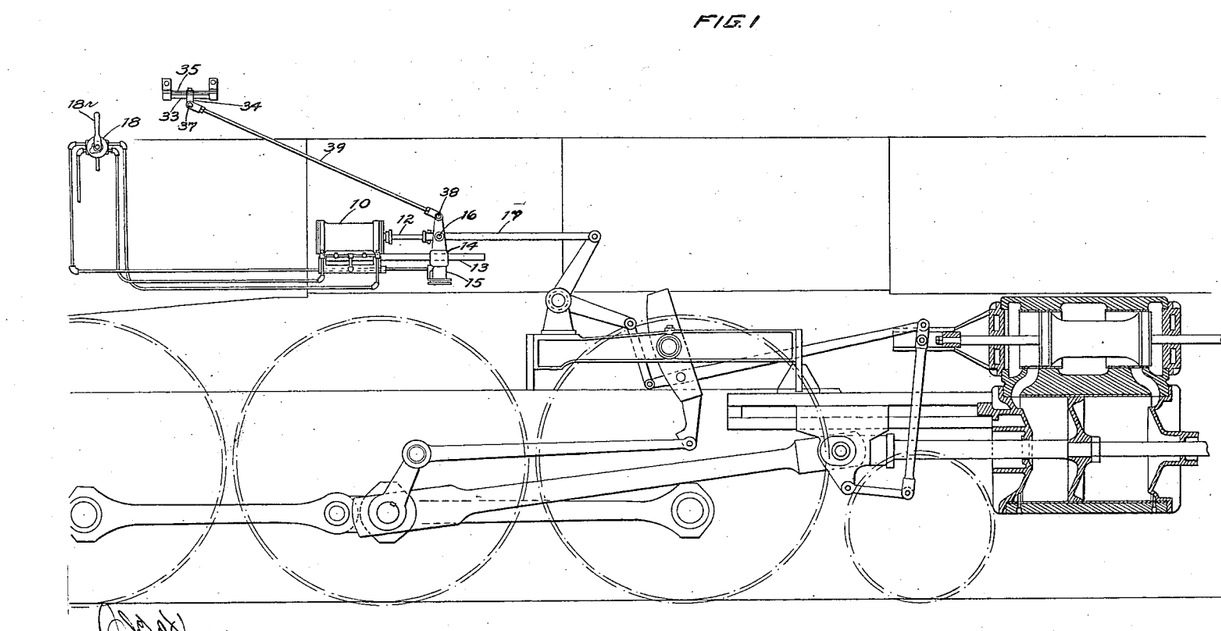
Fig. 1 is a side elevation of the general assembly, the valve chest and cylinder being in section to better illustrate the position of the valve on its seat when all parts are operatively associated as in practice.
Figures 1, 2, 3, 4:
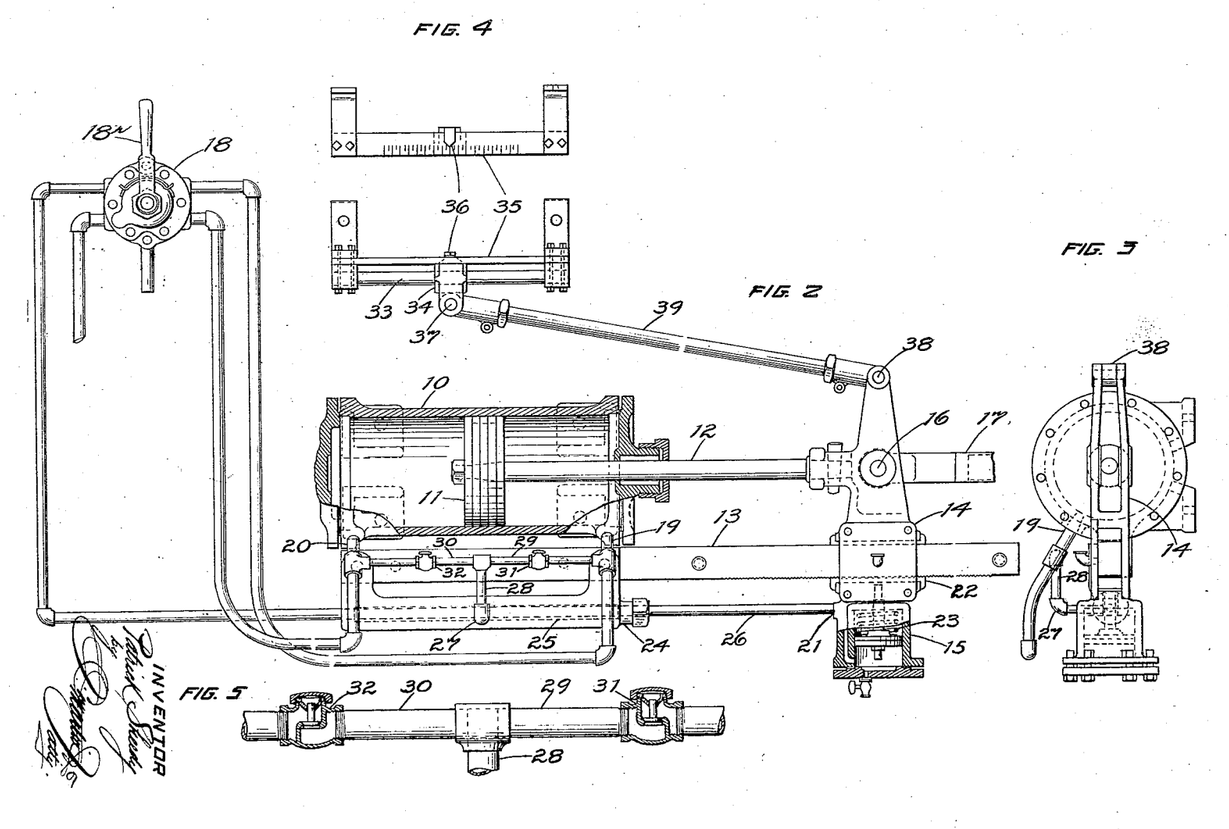
Figure 7:
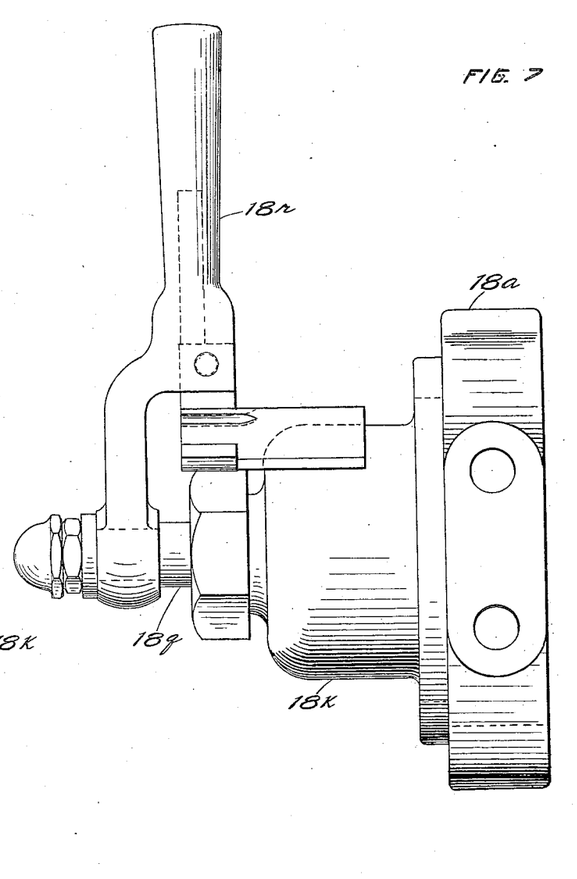
Figure 8:
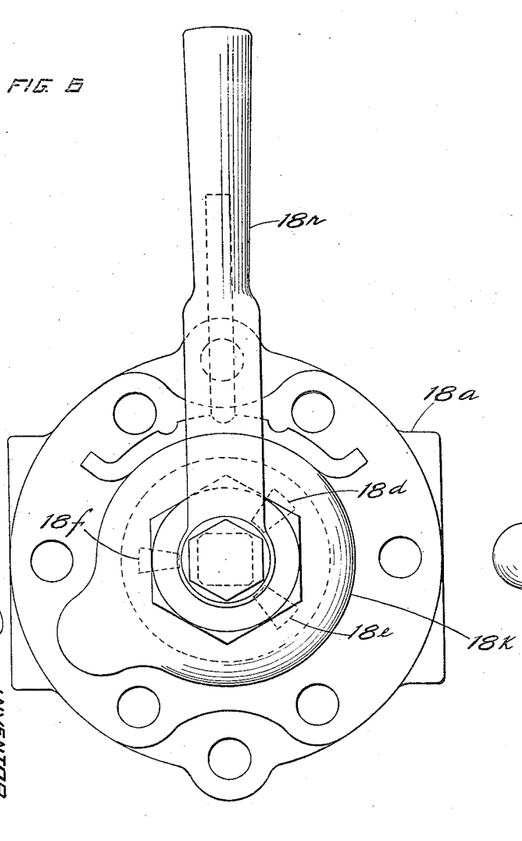
Fig. 8 is a sectional elevation of the operating valve taken on line 8—8, Fig. 9, and shows the position of the inside valve as movable over the seat ports for controlling the fluid pressure through the valve to the working parts of the gear. The main air inlet into the chamber surrounding the valve on its seat is also shown as well as the exhaust outlet and one port leading to the front end of the main cylinder.
Figure 9:
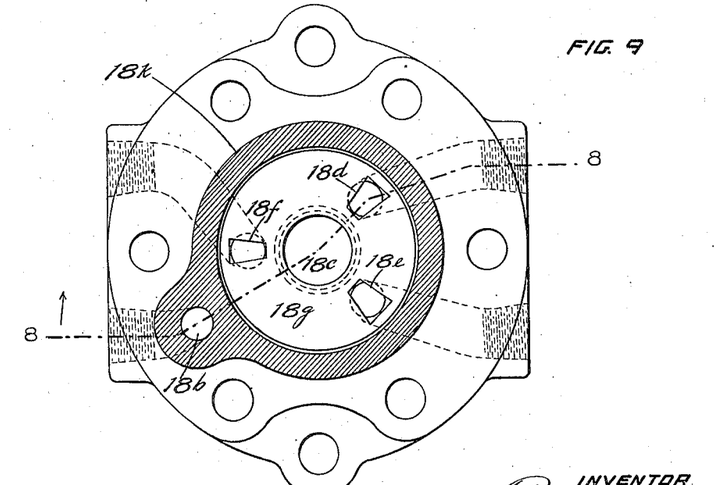
Fig. 9 is a sectional plan view also of operating valve being taken on line 9—9, Fig. 8, and shows the relation of the three seat ports in the body of the valve and their passage through the valve to tapped pipe connections on the outer surface of the body which are connected to the front end of the main cylinder, back end of the main cylinder and to the crosshead locking cylinder. The main air inlet and exhaust outlet are also shown.

Taking the neutral position of the operating valve, 18, as shown in Fig. 1, the air pressure from the locomotive main reservoir passes through the valve into the pipe conduit leading to locking cylinder setting the lock and through the intermediary pipe connection, 28, joined to the pipe conduit leading to the locking cylinder at 27, into the leads 29 and 30, connected into the front end and back end, respectively, of the main cylinder, 10, lifting the check valves, 31 and 32, and permitting pressure to enter the cylinder, 10, on either side of the piston, 11, the pressure backing up in the pipe conduits connecting the operating valve, 18, with the front and back end of cylinder at 19 and 20, respectively, as far as the ground valve seat in the valve, 18, the seat forming a dead or sealed end, as it were, for both pipe inlets into main cylinder, 10, so that no wastage of pressure occurs in this direction. Fig. 10 clearly shows the seat ports, 18ᵈ, and 18ᵉ, blanked against the ground seat of valve, 18ʰ, as above stated. By holding the pressure through the operating valve in the one direction, the full pressure is always utilizable through the conduits leading into either end of the cylinder, 10, to continuously maintain the balanced or equalized pressure on either side of the piston, 11, it obviously being possible to have a very material leakage on either or both sides of the piston, 11, and still maintain the equalized pressure, such a leakage, for example, as would occur through blowing piston rod packing, or leaky cylinder head joints, or in fact a blow hole or crack through defective castings.

What I claim is:—

1. In a valve reversing mechanism, a main cylinder with piston and piston rod, a crosshead, a guide bar, a valve reach rod, connection between the piston, crosshead and valve reach rod, a cylinder on the crosshead with piston and piston rod, the piston rod terminating in a lock engaging the guide bar, a valve connected to a source of fluid pressure, connection between the valve and the front and rear ends of the main cylinder, connection between the valve and the crosshead locking cylinder and connection between both ends of the main cylinder and crosshead locking cylinder, means within the valve for delivering pressure into the crosshead locking cylinder simultaneously with the delivery of pressure into both ends of the main cylinder against the piston therein and for simultaneously releasing the pressure from the crosshead locking cylinder and the opposite ends of the main cylinder in advance of admitting pressure to either end of the main cylinder and simultaneously releasing pressure from its opposite end, the fluid pressure connection through the valve for simultaneously admitting and releasing pressure to both ends of the main cylinder and to the crosshead cylinder being separate from the fluid pressure connection through the valve for simultaneously admitting and releasing pressure to the opposite ends of the main cylinder.

2. In a valve reversing mechanism, a main cylinder with piston and piston rod, a crosshead, a guide bar, a valve reach rod, connection between the piston, crosshead and valve reach rod, a cylinder on the crosshead with piston and piston rod, the piston rod terminating in a lock engaging the guide bar, a rotary valve connected to a source of fluid pressure, connection between the valve and the front and rear ends of the main cylinder, connection between the valve and the crosshead locking cylinder and connection between both ends of the main cylinder and crosshead locking cylinder, means within the valve for delivering pressure into the crosshead locking cylinder simultaneously with the delivery of pressure into both ends of the main cylinder against the piston therein and for simultaneously releasing the pressure from the crosshead locking cylinder and the opposite ends of the main cylinder in advance of admitting pressure to either end of the main cylinder and simultaneously releasing pressure from its opposite end, the fluid pressure connection through the valve for simultaneously admitting and releasing pressure to both ends of the main cylinder and to the crosshead cylinder being separate from the fluid pressure connection through the valve for simultaneously admitting and releasing pressure to the opposite ends of the main cylinder, the valve operation for the accomplishment of which occurs in stages independent of each other.

3. In a valve reversing mechanism, a main cylinder with piston and piston rod, a crosshead, a guide bar, a valve reach rod, connection between the piston, crosshead and valve reach rod, a cylinder on the crosshead with piston and piston rod, the piston rod terminating in a lock engaging the guide bar, a valve connected to a source of fluid pressure, connection between the valve and the front and rear ends of the main cylinder, connection between the valve and the crosshead locking cylinder and connection between both ends of the main cylinder and crosshead locking cylinder, pressure admitting and retaining valve means in the connection between the ends of the main cylinder and the crosshead locking cylinder, means within the valve for delivering pressure into the crosshead locking cylinder simultaneously with the delivery of pressure into both ends of the main cylinder against the piston therein and for simultaneously releasing the pressure from the crosshead cylinder and the opposite ends of the main cylinder in advance of admitting pressure to either end of the main cylinder and simultaneously releasing pressure from its opposite end, the fluid pressure connection through the valve for simultaneously admitting and releasing pressure to both ends of the main cylinder and to the crosshead cylinder being separate from the fluid pressure connection through the valve for simultaneously admitting and releasing pressure to the opposite ends of the main cylinder.

4. In a valve reversing mechanism, a main cylinder with piston and piston rod, a crosshead, a guide bar, a valve reach rod, connection between the piston, crosshead and valve reach rod, a cylinder on the crosshead with piston and piston rod, the piston rod terminating in a lock engaging the guide bar, a valve connected to a source of fluid pressure, connection between the valve and the front and rear ends of the main cylinder, connection between the valve and the crosshead locking cylinder and connection between both ends of the main cylinder and crosshead locking cylinder, check valves in the connection between the ends of the main cylinder and the crosshead locking cylinder, means within the valve for delivering pressure into the crosshead locking cylinder simultaneously with the delivery of pressure into both ends of the main cylinder against the piston therein, and for simultaneously releasing the pressure from the crosshead cylinder and the opposite ends of the main cylinder in advance of admitting pressure to either end of the main cylinder and simultaneously releasing pressure from its opposite end, the fluid pressure connection through the valve for simultaneously admitting and releasing pressure to both ends of the main cylinder and to the crosshead cylinder being separate from the fluid pressure connection through the valve for simultaneously admitting and releasing pressure to the opposite ends of the main cylinder.

5. In a valve reversing mechanism, a main cylinder with piston and piston rod, a crosshead, a guide bar, a valve reach rod, connection between the piston, crosshead and valve reach rod, a cylinder on the crosshead with piston and piston rod, the piston rod terminating in a lock engaging the guide bar, a rotary valve connected to a source of fluid pressure, connection between the valve and the front and rear ends of the main cylinder, connection between the valve and the crosshead locking cylinder and connection between both ends of the main cylinder and crosshead locking cylinder, pressure admitting and retaining valve means in the connection between the ends of the main cylinder and the crosshead locking cylinder, means within the valve for delivering pressure into the crosshead locking cylinder simultaneously with the delivery of pressure into both ends of the main cylinder against the piston therein and for simultaneously releasing the pressure from the crosshead cylinder and the opposite ends of the main cylinder in advance of admitting pressure to either end of the main cylinder and simultaneously releasing pressure from its opposite end, the fluid pressure connection through the valve for simultaneously admitting and releasing pressure to both ends of the main cylinder and to the crosshead cylinder being separate from the fluid pressure connection through the valve for simultaneously admitting and releasing pressure to the opposite ends of the main cylinder.

6. In a valve reversing mechanism, a main cylinder with piston and piston rod, a crosshead, a guide bar, a valve reach rod, connection between the piston, crosshead and valve reach rod, a cylinder on the crosshead with piston and piston rod, the piston rod terminating in a lock engaging the guide bar, a rotary valve connected to a source of fluid pressure, connection between the valve and the front and rear ends of the main cylinder, connection between the valve and the crosshead locking cylinder and connection between both ends of the main cylinder and crosshead locking cylinder, check valves in the connection between the ends of the main cylinder and the crosshead locking cylinder, means within the valve for delivering pressure into the crosshead locking cylinder simultaneously with the delivery of pressure into both ends of the main cylinder against the piston therein and for simultaneously releasing the pressure from the crosshead cylinder and the opposite ends of the main cylinder in advance of admitting pressure to either end of the main cylinder and simultaneously releasing pressure from its opposite end, the fluid pressure connection through the valve for simultaneously admitting and releasing pressure to both ends of the main cylinder and to the crosshead cylinder being separate from the fluid pressure connection through the valve for simultaneously admitting and releasing pressure to the opposite ends of the main cylinder.

7. In a valve reversing mechanism, a main cylinder with piston and piston rod, a main crosshead, a guide bar, a valve reach rod, connection between the piston, crosshead and valve reach rod, a cylinder on the crosshead with piston and piston rod, the piston rod terminating in a lock engaging the guide bar, an indicator crosshead, a guide bar for the indicator crosshead, direct connection between the main crosshead and the indicator crosshead, whereby the length of travel of the main crosshead and indicator crosshead are the same, a valve connected to a source of fluid pressure, connection between the valve and the front and rear ends of the main cylinder, connection between the valve, and the crosshead locking cylinder and connection between both ends of the main cylinder and crosshead locking cylinder, means within the valve for delivering pressure into the crosshead locking cylinder simultaneously with the delivery of pressure into both ends of the main cylinder against the piston therein and for simultaneously releasing the pressure from the crosshead cylinder and the opposite ends of the main cylinder in advance of admitting pressure to either end of the main cylinder and simultaneously releasing presssure from its opposite end, the fluid pressure connection through the valve for simultaneously admitting and releasing pressure to both ends of the main cylinder and to the crosshead cylinder being separate from the fluid pressure connection through the valve for simultaneously admitting and releasing pressure to the opposite ends of the main cylinder.

8. In a valve reversing mechanism, a main cylinder with piston and piston rod, a main crosshead, a guide bar, a valve reach rod, connection between the piston, crosshead and valve reach rod, a cylinder on the crosshead with piston and piston rod, the piston rod terminating in a lock engaging the guide bar, an indicator crosshead, a guide bar for the indicator crosshead, direct connection between the main crosshead and the indicator crosshead, whereby the length of travel of the main crosshead and indicator crosshead are the same, a valve connected to a source of fluid pressure, connection between the valve and the front and rear ends of the main cylinder, connection between the valve and the crosshead locking cylinder and connection between both ends of the main cylinder and crosshead locking cylinder, pressure admitting and retaining valve means in the connection between the ends of the main cylinder and the crosshead locking cylinder, means within the valve for delivering pressure into the crosshead locking cylinder simultaneously with the delivery of pressure into both ends of the main cylinder against the piston therein and for simultaneously releasing the pressure from the crosshead cylinder and the opposite ends of the main cylinder in advance of admitting pressure to either end of the main cylinder and simultaneously releasing pressure from its opposite end, the fluid pressure connection through the valve for simultaneously admitting and releasing pressure to both ends of the main cylinder and to the crosshead cylinder being separate from the fluid pressure connection through the valve for simultaneously admitting and releasing pressure to the opposite ends of the main cylinder.

9. In a valve reversing mechanism, a main cylinder with piston and piston rod, a main crosshead, a guide bar, a valve reach rod, connection between the piston, crosshead and valve reach rod, a cylinder on the crosshead with piston and piston rod, the piston rod terminating in a lock engaging the guide bar, an indicator crosshead, a guide bar for the indicator crosshead, direct connection between the main crosshead and the indicator crosshead, whereby the length of travel of the main crosshead and indicator crosshead are the same, a rotary valve connected to a source of fluid pressure, connection between the valve and the front and rear ends of the main cylinder, connection between the valve and the crosshead locking cylinder and connection between both ends of the main cylinder and crosshead locking cylinder, check valves in the connection between the ends of the main cylinder and the crosshead locking cylinder, means within the valve for delivering pressure into the crosshead locking cylinder simultaneously with the delivery of pressure into both ends of the main cylinder against the piston therein and for simultaneously releasing the pressure from the crosshead cylinder and the opposite ends of the main cylinder in advance of admitting pressure to either end of the main cylinder and simultaneously releasing pressure from its opposite end, the fluid pressure connection through the valve for simultaneously admitting and releasing pressure to both ends of the main cylinder and to the crosshead cylinder being separate from the fluid pressure connection through the valve for simultaneously admitting and releasing pressure to the opposite ends of the main cylinder.

10. In a pressure actuating valve, a body, a plurality of ports in the body providing pressure inlets and outlets therethrough, the said ports terminating on their outer ends in pipe connections and on their inner ends in a valve seat, a valve on the seat with ports and outlets, a chamber jointed to the body enclosing the valve, a pressure inlet into the chamber, the valve ports and outlets being so related to the seat ports that upon lapping the valve on the seat one valve port will admit pressure into one seat port while the other valve port is blanked against the seat and two valve outlets will release pressure from two seat ports while the other valve outlets are blanked against the seat.

11. In a pressure actuating valve, a body, a plurality of ports in the body providing pressure inlets and outlets therethrough, the said ports terminating on their outer ends in pipe connections and on their inner ends in a valve seat, a valve on the seat with ports and outlets, a chamber jointed to the body enclosing the valve, a pressure inlet into the chamber, the valve ports and outlets being so related to the seat ports that upon lapping the valve on the seat one valve port will admit pressure into one seat port while the other valve port is blanked against the seat and two valve outlets will release pressure from two seat ports while the other valve outlets are blanked against the seat, one of the two said seat ports releasing pressure into one of the two said valve outlets in advance of the other.

12. In a pressure actuating valve a body, four ports in the body, terminating on their outer ends in pipe connections and on their inner ends in a valve seat, two of the ports being the same size, one smaller and one larger, a valve on the seat with ports therein, one larger than the other, the smaller valve port being the same size as the smaller seat port, and the larger seat port being the same size as the like sized seat ports, the valve having four exhaust depressions on its seat face leading into a central exhaust cavity, two of the depressions being larger than the other two, and two the same size as the two like sized seat ports, except the size of the neck leading into the central cavity, the two larger depressions being the same size and equi-distant from either side of the smaller valve port and the two smaller depressions being the same size and equi-distant from either side of the larger valve port, a chamber joined to the body enclosing the valve, a pressure inlet into the chamber, the larger of the seat ports in the body providing an exhaust outlet coincident with the central exhaust cavity of the valve, the normal position of the valve on its seat providing coincidence of the smaller valve port and smaller seat port and the blanking of the larger valve port against the valve seat equi-distant between the two like sized seat ports.

PATRICK SHEEDY.

Witnesses:
C. J. MARTIN, Jr.,
CHAS. F. WADAK.